Aug. 25, 1959 J. G. INGRES 2,900,962
BOOSTER BRAKE MECHANISM
Filed Dec. 18, 1953 2 Sheets-Sheet 2
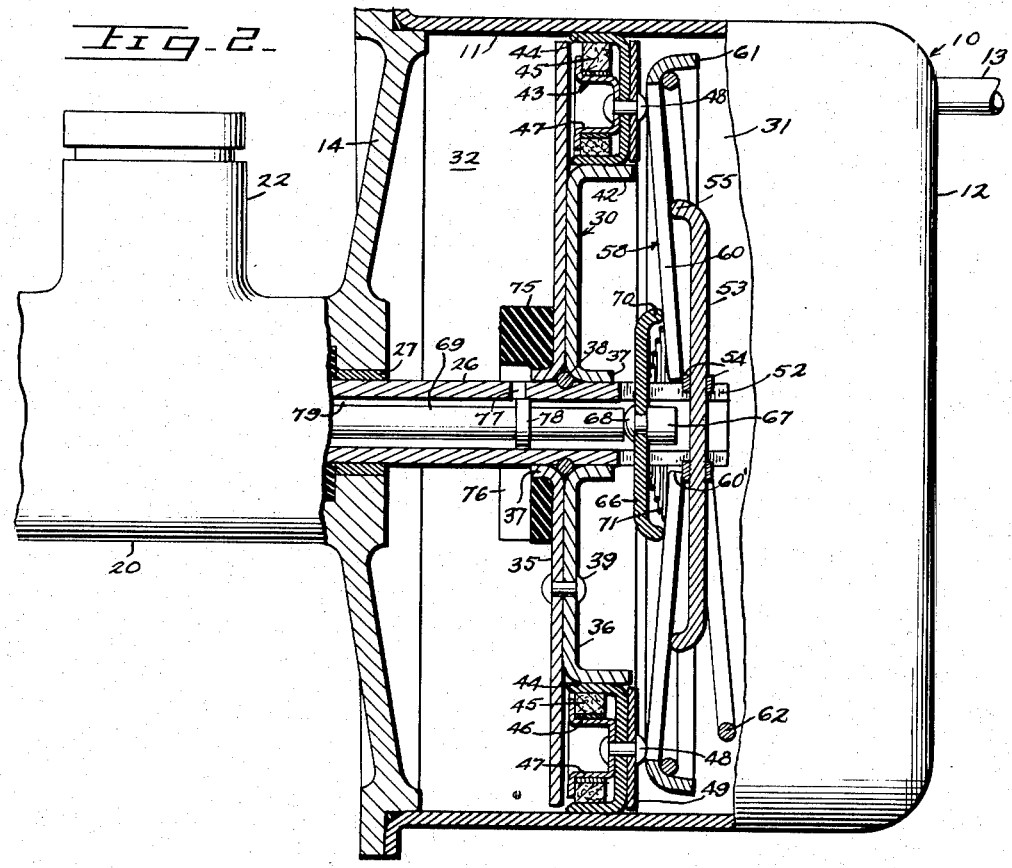
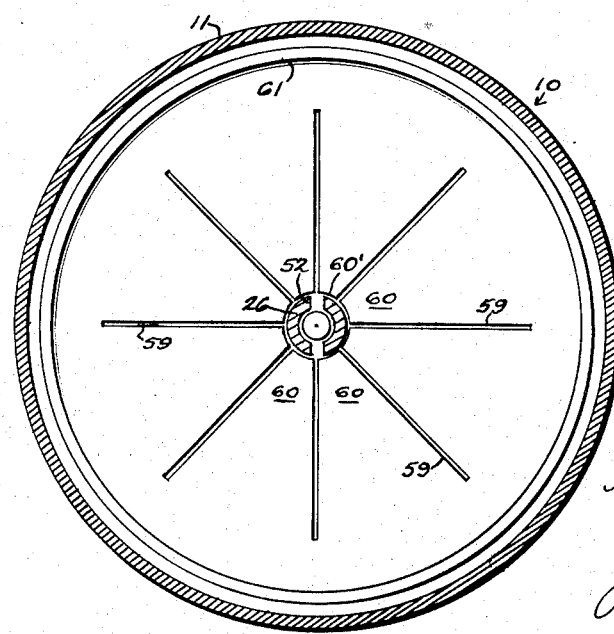
INVENTOR
JEANNOT G. INGRES
John F. Phillips
ATTORNEY United States Patent Office 2,900,962
Patented Aug. 25, 1959

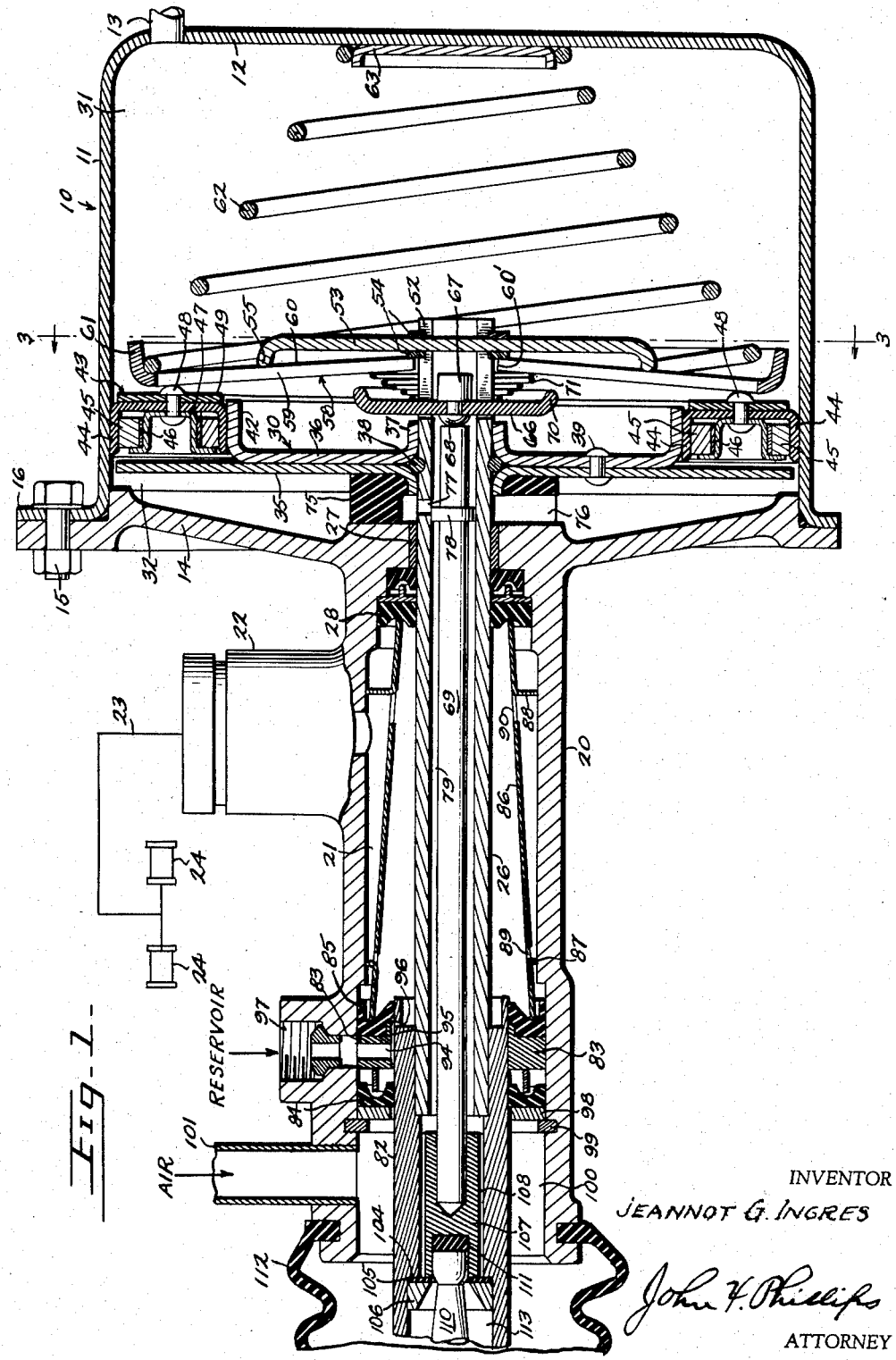

2,900,962

BOOSTER BRAKE MECHANISM

Jeannot G. Ingres, Dearborn, Mich., assignor to Kelsey-Hayes Company, a corporation of Delaware Application December 18, 1953, Serial No. 399,030

7 Claims. (Cl. 121—41)

This invention relates to booster brake mechanisms of the type employing an elastic fluid pressure motor for boosting the action of the foot in applying the brakes of a motor vehicle.

It is common practice in the booster brake field to provide the fluid pressure operated booster motor with a valve mechanism arranged internally of or otherwise carried by the pressure responsive unit of the booster. This usually requires involved structures which are relatively expensive to manufacture. It is also the common practice to provide booster brake mechanisms wherein the motors are of the "pusher" type, that is, the pressure responsive units of the motor exert a pushing force on a fluid displacing member projecting into the master cylinder. Boosters of this type require the mounting of parts of the mechanism in both heads of the booster motor. In other words, motion is transmitted to the follow-up valve mechanism of the booster motor through one head thereof, while the fluid displacing plunger or similar element projects through the other head of the motor.

An important object of the present invention is to provide a novel "puller" type of booster mechanism wherein all operating parts projecting into the motor from a point externally thereof extend through one head of the motor, the other motor head being solid, thus providing for the use of a simple stamping for use as a motor cylinder.

A further object is to provide a booster of the type referred to wherein the entire structure is highly simplified, particularly with respect to the control valve mechanism, thus effecting substantial economies in manufacture.

A further object is to provide a booster brake mechanism of the type referred to having novel means for transmitting reaction forces to the brake pedal operated rod to provide the latter with "feel."

A further object is to provide a brake booster motor wherein the pressure responsive unit of the motor is formed of a pair of sections which are relatively movable, and wherein such relative movement is utilized in a novel manner to react against the pedal operated rod which controls the valve mechanism.

A further object is to provide a mechanism of this character with a highly simplified type of control valve mechanism wherein a single land controls a single opening in the motor to balance pressures on opposite sides of the pressure responsive unit or to establish differential pressures in the motor when the brakes are to be applied.

Other objects and advantages of the invention will become apparent during the course of the following description.

In the drawings I have shown one embodiment of the invention. In this showing:

Figure 1 is an axial sectional view through the booster mechanism, parts being broken away and parts being shown in elevation, the mechanism being shown with the motor de-energized and with all of the parts in normal off positions, Figure 2 is a similar view, partly in elevation, showing the parts in motor-energized positions, and Figure 3 is a section on line 3—3 of Figure 1, the return spring being omitted.

Referring to Figures 1 and 2, the numeral 10 designates a booster motor as a whole, comprising a pressed cylinder 11 having an integral head 12 at one end. As distinguished from boosters of the pusher type, the head 12 is solid and unbroken, except for the extension therethrough of a nipple 13 adapted for connecting with a source of relatively low pressure, for example, the intake manifold of a motor vehicle engine. The other end of the cylinder 11 is closed by a preferably cast head 14 secured thereto by bolts 15 extending through an annular flange 16 formed integral with the cylinder 11.

Preferably cast integral with the head 14 is a master cylinder 20 having a hydraulic chamber 21 therein communicating through a conventional residual pressure valve 22 with lines 23 leading to the wheel cylinders, two of which have been diagrammatically shown and indicated by the numeral 24.

A sleeve 26 is slidable through a bearing 27 carried by the head 14 and adjacent which is arranged suitable fluid sealing means 28. Within the motor 10, the sleeve 26 is secured in a manner to be described to a pressure responsive unit indicated as a whole by the numeral 30 which divides the motor to form a constant pressure chamber 31 and a variable pressure chamber 32. When the intake manifold is employed as the source of low pressure, vacuum always will be present in the chamber 31, and also in the chamber 32 in a manner to be described, when the motor is inoperative. Motor actuation is effected by cutting off the chamber 32 from the source of vacuum and admitting atmospheric pressure thereinto.

The pressure responsive unit 30 comprises a pair of plates 35 and 36, provided at their inner peripheries with oppositely extending flanges 37 between which is arranged a snap ring 38 engaging the sleeve 26 to positively position the plates 35 and 36 relative to the sleeve 26. The plates 35 and 36 are secured together by rivets 39 or any other suitable means. The securing of these plates together and their engagement with the snap ring 38 which, in turn, engages the sleeve 26, positively fixes the pressure responsive unit 30 against movement relative to the sleeve 26.

The plate 35 extends radially outwardly into proximity with the inner surface of the cylinder 11. The plate 36 is of smaller diameter and is provided with a peripheral cylindrical flange 42 defining with the cylinder 11 an annular space in which is arranged a section of the pressure responsive unit indicated as a whole by the numeral 43, and axially relatively movable with respect to the plates 35 and 36, as will become apparent. The movable section 43 of the unit 30 comprises a double lipped leather or similar cup 44 having outer and inner lips slidable respectively over the surface of the cylinder 11 and over the radially outer surface of the flange 42. Each lip of the cup is backed up by an annular felt or similar ring 45 which, in turn, is backed up by a resilient metal ring 46. These two rings, in turn, are backed up by an annular ring 47 riveted as at 48 to the cup 44 and to a backing plate 49 forming a pressure plate for the cup 44 as will become apparent.

The sleeve 26 has its inner end diametrically slotted as at 52 (Figures 1 and 3). A plate 53 is apertured to fit the slotted end of the sleeve 26. This aperturing is effected by stamping two arcuate openings in the plate 53 corresponding to the arcuate shaping of the portions of the sleeve 26 on opposite sides of the slots 52. The plate 53 is fixed to the sleeve 26 by snap rings 54 at opposite sides thereof. The periphery of the plate 53 is turned toward the pressure responsive unit to form an annular flange 55 having a rounded edge, for a purpose to be described.

A "lever" plate 58 is arranged to the left of the plate 53 as shown in Figure 1. This plate is radially slotted as at 59 (see particularly Figure 3) to form a plurality of segments 60, the inner extremities of which are free of each other, the slots 59 extending radially inwardly to a central opening 60' surrounding the sleeve 26. The fingers 60 are formed integral with a solid radially outer flanged portion 61 arranged radially outwardly of the rivets 48. The flange 61 serves to tie the segments together, while at the same time permitting them to flex, for a purpose to be described. Within the flange 61 is seated one end of a return spring 62, the opposite end of which engages the cylinder head 12 outwardly of a positioning plate 63. The force of the spring 62, applied radially outwardly of the rivets 48, the heads of which bear against the segments 60, tends to swing the inner ends of these segments toward the right, as viewed in Figure 1. It will be noted that the flange 55 bears against the segments 60, forming fulcrums for these elements which function as levers, as will become apparent below.

A second plate 66 is slidable relative to the sleeve 26 within the longitudinal limits of the slots 52. The plate 66 is apertured in the same manner as the plate 63 to slide over the slotted end of the sleeve 26. The plate 66 carries an axial button 67 having a shank projecting into the plate 66 and riveted over at the opposite side of the plate to form a head 68 engageable with the adjacent end of a valve rod 69. The plate 66 is provided with a peripheral flange 70 turned toward the segments 60 and preferably rounded for engagement with such segments under conditions to be described.

A compression spring 71 is interposed between the plate 66 and the segments 60 and normally adds to the force of the return spring 62, tending to swing the radially inner ends of the segments 60 toward the right as viewed in Figure 1. Such ends of the segments 60, accordingly, normally engage the adjacent snap ring 54. The reaction of the spring 71 maintains the head 68 in engagement with the adjacent end of the rod 69.

A rubber or similar bumper 75 is bonded to the plate 35 and is engageable with the adjacent end wall of the master cylinder to limit movement of the plates 35 and 36 and associated elements toward the left to the normal off position shown in Figure 1. The bumper 75 is radially slotted as at 76 to form a chamber communicating with the motor chamber 32 and communicating with the interior of the sleeve 26 through a port 77 therethrough. The rod 69 is provided with a single land 78 controlling communication between the chamber 76 and the interior of the sleeve 26. The land 78 normally occupies the position shown in Figure 1, in which case, the port 77 is in communication around the rod 69 with the motor chamber 31. Movement of the rod 69 to the right, in a manner to be described, disconnects port 77 from the vacuum end of the motor and connects it to the atmosphere through the space 79 between the sleeve 26 and rod 69 and through valve means to be described.

A fluid displacing plunger sleeve 82 is fixed to the outer end of the sleeve 26 and is slidable through a bearing 83 in the master cylinder, provided at opposite sides thereof with seals 84 and 85. A seal retainer 86 extends between the seals 28 and 85 and is provided with positioning lips 87 and 88 stamped from the positioning member 86 and providing therethrough apertures 89 and 90. Accordingly, the master cylinder has its space inwardly of the member 86 communicating with the space outwardly thereof.

The bearing 83 is apertured as at 94. Bearing 83 is also provided with an inner longitudinal groove 95 communicating with a small port 96 in the fluid displacing member 82, whereby any fluid lost from the master cylinder or the braking system will be replenished in the off position of the parts, from a reservoir (not shown) connected to port 97.

The seal 84 is backed up by a washer 98 held in position by a snap ring 99. To the left of this snap ring, the interior of the master cylinder body forms an air chamber 100 communicating with an air pipe 101 which may be provided with a conventional air cleaner (not shown).

The fluid displacing member 82 is provided internally thereof with a shoulder 104 against which is arranged a flexible seal 105 held in position by a pressed-in retaining ring 106. The slidable air valve 107 is carried by the left-hand end of the rod 69 as viewed in Figure 1, and is longitudinally grooved throughout its length in its outer surface as at 108 to form air passages in constant communication with the space 79. The left-hand end of the member 107 engages the seal 105 in the off position of the parts to prevent the admission of air into the grooves 108.

A valve operating rod 110 projects into the end of the valve 107 and engages a cushion member 111 therein. The rod 110 is connected in any suitable or conventional manner with the brake pedal of the motor vehicle to be actuated thereby. A collapsible boot 112 has one end fixed as shown to the body of the master cylinder. This boot extends beyond the left-hand end of the fluid displacing member 82 (not shown) and beyond such end; the opposite end of the boot 112 is sealed to the rod 110. This arrangement of parts is now conventional and need not be shown in detail. It will be apparent that the space or chamber 100 is always in communication with the space 113 around the rod 110 through the boot 112 and around the outer end of the member 82.

*Operation*

The parts normally occupy the positions shown in Figure 1. As previously stated, the return spring 62 and biasing spring 71 normally retain the free ends of the segments 60 in engagement with the adjacent snap ring 54, while the spring 71 maintains the head 68 in engagement with the adjacent end of the valve rod 69. The snap ring 54 limits swinging movement of the segments 60, and consequently limits movements to the left of the portions of the member 58 engaging the heads of the rivets 48. The movable section 43 of the pressure responsive unit, accordingly will occupy the position shown in Figure 1.

When the brakes are to be applied, the operator will depress the brake pedal (not shown), thus moving rod 110, valve 107, rod 69 and land 78 toward the right. Initial movement of the parts referred to disengages the valve 107 from the seal 105, thus connecting space 79 to the atmosphere. It will be apparent that leakage to some extent around the land 78 cannot be avoided, but this is immaterial, in view of the normal engagement of the valve 107 with the seal 105. As soon as the valve 107 is disengaged from the seal, atmospheric pressure will exist in the space 79 up to the land 78, and any slight leakage around the land 78 at this point will be unimportant in the operation of the device.

Relatively slight movement of the land 78 will cause it to bridge across the port 77, and the motor chamber 32 will be disconnected from the motor vacuum chamber 31. Slight additional movement of the land 78 will connect the space 79 to the port 77 and air will flow into the motor chamber 32, thus raising the pressure in this chamber while vacuum will remain in the motor chamber 31. The pressure responsive unit 30 moves toward the right, and the fluid displacing member 82 will move into the master cylinder to displace fluid through brake lines 23 into the brake cylinders 24.

It will be apparent that initial movement of the brake pedal, and consequently the rod 69, takes place solely against the biasing spring 71, thus providing a "soft" pedal, as is desirable. As soon as the brake shoes have initially engaged the drums, the resistance to movement of the fluid displacing member 82 will increase, the fluid pressure in the master cylinder chamber 21 now substantially increasing. The section of the pressure responsive unit comprising the plates 35 and 36 is positively connected through sleeve 26 to the displacing member 82, and increased pressure in the master cylinder chamber 21 accordingly will tend to retard movement of the plates 35 and 36 without affecting the relatively movable section 43 of the pressure responsive unit. This section, therefore, will move relatively to the right in Figure 1 under the influence of air pressure in the chamber 32. Inasmuch as the plate 53 is stationary relative to the plates 35 and 36, movement of the section 43 will cause the heads of the rivets 48 to exert pressure against the segments 60. These segments will fulcrum on the edge of the flange 55 and the inner ends of the segments will swing inwardly against the tension of the spring 71 to engage the flange 70. The segments 60 thereupon will exert a reaction force against the brake pedal through plate 66, rod 69, etc. Thus, the brake pedal will be provided with "feel" in accordance with the energization of the motor 10 after the brake shoes have been brought into engagement with the drums and actual braking forces are applied.

The valve mechanism referred to provides a perfect follow-up action of the pressure responsive unit of the motor relative to the brake pedal. Whenever movement of the brake pedal is stopped, the sleeve 26 will move to the right the slight distance necessary to return the land 78 to lap position relative to the port 77. This slight additional movement of the sleeve 26 takes place without positively moving the pressure responsive section 43, and accordingly, no appreciable build-up in reaction of the brake pedal against the foot will occur during such operation.

A point of maximum energization of the motor 10 will be reached, beyond which additional motor power cannot be developed. At the same time, pressures in the master cylinder chamber 21 will increase for relatively heavy brake applications. Accordingly, a point will be reached in which there will be what is termed in the industry a "run-out" of power in the motor 10. This point occurs before full brake application. Beyond this point, brake application can be increased by increasing the pressure of the foot on the brake pedal. Under such conditions, pedal operation of the rod 69, with the motor plates 35 and 36 remaining stationary, will move the plate 66 toward the right against the segments 60. It should be remembered that previous to such point in the operation of the device, the segments 60 will have been in engagement with the flange 70 and out of engagement with the adjacent snap ring 54. The added pedal pressure after a power "run-out" causes the flange 70 to swing the radially inner ends of the segments 60, the movable pressure responsive section 43 incidentally moving toward the left, until the segments 60 are moved into engagement with the adjacent snap ring. The parts will now assume the positions shown in Figure 2, beyond which point all of the reciprocating parts of the motor will move as a unit toward the right. The operator will then provide, by foot pressure, assisted by the motor in its maximum energized condition, whatever additional pressure is necessary in the master cylinder 21, brake lines 23 and wheel cylinders 24.

The retractile movement of the parts will be apparent. When the brake pedal is released, the biasing spring 71 will move the rod 69 to the left, thus seating the valve 107 against the seal 105 to disconnect the space 79 from the atmosphere. The land 78 will then occupy the position relative to the sleeve 26 shown in Figure 1, opening the port 77 to the constant pressure chamber 31 of the motor to exhaust air from the chamber 32, thus re-establishing the vacuum suspension of the pressure responsive unit 30. The return spring 62 will return the pressure responsive unit to the off position of the parts.

From the foregoing, it will be apparent that the present construction embodies a highly simplified type of valve mechanism projecting through a sleeve arranged in the master cylinder and connected to the fluid displacing member operable in the master cylinder. Forces are applied from the brake pedal to the valve rod 69 at the master cylinder end of the apparatus, and accordingly, parts project only through one head of the motor, the head 12 being solid execpt for the pipe 13. This greatly simplifies the motor structure. The broad use of the reaction segments 60 is disclosed and claimed in the prior application of Jeannot G. Ingres, Serial No. 394,683, filed November 27, 1953. However, the segmental construction in the present case is novel over the arrangements shown in the co-pending application referred to for several reasons. In the first place, the segments 60 are an integral part of and are fixed in position by the flange 61, and this flange serves the additional function of providing a seat for one end of the return spring 62. The arrangement of the segmental lever elements 60 is also novel in its association with the movable section 43 which forms in itself a differential fluid pressure responsive unit which is utilized for operating the lever segments 60 to transmit reaction forces to the brake pedal.

It is a comparatively simple matter to stamp the plates 53 and 66 to provide arcuate openings, which permits these plates merely to be slipped into position on the end of the sleeve 26. In assembling the parts, the plate 66 is first placed in the position shown, followed by the placing of the spring 71 and lever member 58. The adjacent snap ring 54 is then placed in position, after which, the plate 53 is slipped into position and backed up by the other snap ring 54, whereupon all of the parts referred to will be retained in position and cannot be displaced. The snap rings 54 serve to fix the plate 53 in position, and one of these rings serves as a bearing member for engaging the radially inner ends of the segments 60.

Accordingly, it will be apparent that the device is highly simplified, both as to structure and assembly, and that the unit as a whole utilizes a minimum of space for installation on a motor vehicle.

It is to be understood that the form of the invention shown and described is for the purpose of illustration, the scope of the invention being defined in the appended claims.

I claim:

1. A motor mechanism comprising a fluid motor having a pressure responsive unit therein formed of inner and outer concentric relatively axially movable sections in sliding fluid-seal relation to each other, a member to be operated, the inner of said sections being positively connected to said member, a valve having fluid connection with said motor and with a pressure source and movable from a normal position for establishing differential pressures in said motor to actuate said pressure responsive unit and move said member, and means connected for utilizing relative movement of said sections upon energization of said motor for opposing motor-energizing movement of said valve.

2. Apparatus constructed in accordance with claim 1 wherein the means for opposing motor energizing movement of said valve comprises lever means engageable with said valve and with said sections.

3. Apparatus constructed in accordance with claim 1 wherein the means for opposing motor energizing movement of said valve comprises a plate having a solid peripheral flange and integral segmental fingers projecting radially inwardly therefrom and forming lever elements having radially inner and outer portions mechanically engaging respectively said valve and the outer of said sections.

4. A motor mechanism comprising a fluid motor having a pressure responsive unit therein formed of inner and outer relatively axially movable sections in fluid sealing relationship with each other, a member to be operated, a sleeve connecting said member with said inner section, a valve in said sleeve having a normal position balancing pressures in opposite ends of said motor and movable in said direction from such normal position to connect one end of said motor to a source of higher pressure to energize said motor and move said pressure responsive unit in said direction, a pedal-operable rod carrying said valve, a reaction plate in said motor having a portion engaging the adjacent end of said rod, a force transmitting plate connected to said sleeve in said motor, and lever means engageable with said reaction plate, said force transmitting plate and said outer section upon movement of the latter during energization of said motor to apply a force to said reaction plate to oppose movement of said valve in said direction from its normal position.

5. Apparatus constructed in accordance with claim 4 wherein said lever means comprises a plate having an outer annular flange, said plate inwardly of said flange being divided into a plurality of segmental fingers engageable with said reaction plate, said force transmitting plate and said outer section, a return spring engaging at one end with the plate of said lever means radially outwardly of its contact with said outer section and at its opposite end with the head of said motor remote from said master cylinder, and a spring interposed between said reaction plate and the radially inner ends of said segmental fingers to normally space the latter from said reaction plate whereby said valve is movable in said direction from its normal position free of said segmental fingers until after said motor is energized.

6. A motor mechanism comprising a fluid motor having a pressure responsive unit therein formed of inner and outer concentric relatively axially movable sections in fluid sealing relation to each other, a member to be operated, the inner of said sections being positively connected to said member, a valve having fluid connection with said motor and with a pressure source and movable from a normal position for establishing differential pressures in said motor to actuate said pressure responsive unit and move said member, and means connected for utilizing relative movement of said sections upon energization of said motor for opposing motor-energizing movement of said valve, said means comprising a plate having segmental fingers forming lever elements having radially inner and outer portions mechanically engaging respectively with said valve and the outer of said sections and having mechanical connection intermediate said radially inner and outer portions with the inner of said sections.

7. A motor mechanism comprising a fluid motor having a pressure responsive unit therein formed of radially inner and outer relatively axially movable sections, a member to be operated, connecting means between said member and said inner section, a valve device having a normal position connecting opposite ends of said motor to each other to balance pressures therein and movable in said direction from such normal position to connect one end of said motor to a source of higher pressure to move said pressure responsive unit in said direction, a pedal operable member connected to control said valve device, a reaction plate in said motor having a portion engaging said pedal operable member, a force transmitting plate connected to said connecting means, and lever means engageable with said reaction plate, with said force transmitting plate and with said outer section to apply to said reaction plate a force opposing movement of said valve device in said direction from its normal position upon relative axial movement of said movable sections.

References Cited in the file of this patent
UNITED STATES PATENTS

| | | |
|---|---|---|
| 2,006,487 | Sorensen | July 2, 1935 |
| 2,152,084 | Paine | Mar. 28, 1939 |
| 2,181,757 | Fitzgerald | Nov. 28, 1939 |
| 2,197,075 | Fitzgerald | Apr. 16, 1940 |
| 2,265,546 | Price | Dec. 9, 1941 |
| 2,322,063 | Schnell | June 15, 1943 |
| 2,360,578 | Porter | Oct. 17, 1944 |
| 2,406,328 | Gunderson | Aug. 27, 1946 |
| 2,457,721 | Price | Dec. 28, 1948 |
| 2,475,105 | Mitton | July 5, 1949 |
| 2,532,960 | Stelzer | Dec. 5, 1950 |
| 2,603,066 | Rockwell | July 15, 1952 |
| 2,685,171 | Price | Aug. 3, 1954 |
| 2,761,427 | Shumaker | Sept. 4, 1956 |